(12) United States Patent
Gallot (10) Patent No.: US 8,052,763 B2
(45) Date of Patent: Nov. 8, 2011

(54) METHOD FOR REMOVING DISSOLVED SOLIDS FROM AQUEOUS WASTE STREAMS

(75) Inventor: Jean-Claude Gallot, Naperville, IL (US)

(73) Assignee: HPD, LLC, Plainfield, IL (US)

( * ) Notice: Subject to any disclaimer, the term of this patent is extended or adjusted under 35 U.S.C. 154(b) by 809 days.

(21) Appl. No.: 12/128,871

(22) Filed: May 29, 2008

(65) Prior Publication Data

US 2009/0294377 A1    Dec. 3, 2009

(51) Int. Cl.
*B01D 9/00* (2006.01)

(52) U.S. Cl. .................. 23/295 R; 588/405; 588/410

(58) Field of Classification Search ............... 23/295 R; 588/405, 410; 423/235, 240 R, 242.1
See application file for complete search history.

(56) References Cited

U.S. PATENT DOCUMENTS

| | | | |
|---|---|---|---|
| 3,362,457 A | 1/1968 | Chirico | |
| 4,186,176 A * | 1/1980 | Kitamura et al. | ............. 423/235 |
| 6,233,958 B1 | 5/2001 | Mei et al. | |
| 6,589,497 B2 | 7/2003 | Smith | |
| 6,893,474 B2 * | 5/2005 | Jafverstrom et al. | ....... 23/305 A |
| 2007/0051513 A1 | 3/2007 | Heins | |

OTHER PUBLICATIONS

Hofmann, G.; Schmitz, R.; Jung, H.; "Treatment of Waste Material: Flue Gas Cleaning"; pp. 3-10.

Hofmann, G.; Schmitz, R.; Jung, H.; "Operational Experience Gained in the Evaporation of Scrubber Liquors From Flue Gas Purification in the Thermal Treatment of Industrial Waste in the RZR Herten Centre"; Translation from AbfallwirtschaftsJournal 4 (1992), Nr. 12; 15 pages.

* cited by examiner

*Primary Examiner* — Edward Johnson
(74) *Attorney, Agent, or Firm* — Coats & Bennett, P.L.L.C.

(57) ABSTRACT

A method for removing dissolved solids from a waste stream, such as that produced in flue gas scrubbing, through an evaporation-crystallization process operated at relatively low temperature. A waste stream is directed into an evaporator and heated at a temperature of less than 60° C. at a pressure below atmospheric pressure. The waste stream is concentrated through the evaporation process and forms a slurry stream having crystallized solids. At the low temperature of evaporation, the solids crystallize at substantially lower temperature and the solution has a substantially lower boiling point elevation than at atmospheric pressure. The slurry stream is directed to a solid-liquid separator where the crystallized solids in the slurry stream are separated, producing a solid cake and mother liquor.

29 Claims, 4 Drawing Sheets

METHOD FOR REMOVING DISSOLVED SOLIDS FROM AQUEOUS WASTE STREAMS

FIELD OF INVENTION

The present invention relates to a process for precipitating dissolved solids in a waste stream using an evaporation-crystallization system operated under low pressure and low temperature. In particular this process is applicable to zero liquid discharge systems to treat wastewaters derived from leachate collecting systems used in landfills or wet scrubbing operations such as those used in flue gas desulfurization and coal gasification.

BACKGROUND

Burning or gasifying coal or petcoke produces a gas containing various contaminants. In coal-fired power stations, flue gas desulfurization (FGD) is often employed to scrub most of the sulfur dioxide from flue gas. Similarly, a gas scrubbing step is utilized in most gasification processes used for coal and petroleum coke to produce syngas. In wet scrubbing processes, an alkaline agent dissolved in water, reacts with and removes contaminants from the flue gas. Wet scrubbers typically require continuous blowdown to limit the accumulation of corrosive salts and suspended solids washed from the gas stream.

Most wet scrubbers typically spray the flue gas with a slurry containing limestone ($CaCO_3$). Sulfur dioxide ($SO_2$) in the flue gas reacts with the limestone to form calcium sulfite ($CaSO_3$). This product is further oxidized to produce gypsum ($CaSO_4.2H_2O$) by introducing air into the scrubber. Although the compositions of scrubber waste streams vary depending on the fuel type and scrubbing reagent used, the waste streams are generally a chloride solution saturated with gypsum and contain calcium, magnesium, sodium, potassium and trace amounts of heavy metals. These salts are extremely soluble and have high boiling point elevations.

Contaminants found in a flue gas waste stream from a flue gas scrubber using limestone to remove contaminants are given below in Table 1.

TABLE 1

| Contaminant | Typical Concentrations |
|---|---|
| Calcium | 4250 mg/l |
| Magnesium | 950 mg/l |
| Sodium | 590 mg/l |
| Potassium | 25 mg/l |
| Iron | 15 mg/l |
| Chloride | 10,000 mg/l |
| Sulfate | 1320 mg/l |
| Nitrate | 90 mg/l |
| Fluoride | 12 mg/l |
| Silica | 28 mg/l |
| Total Suspended Solids | 5,000 mg/l |
| m-Alkalinity | 280 mg/l as CaCO3 |

Contaminants found in a flue gas waste stream from a flue gas scrubber using dolomitic limestone to remove contaminants are given in Table 2.

TABLE 2

| Contaminant | Typical Concentrations |
|---|---|
| Calcium | 1,200 mg/l |
| Magnesium | 9,900 mg/l |
| Sodium | 1,700 mg/l |
| Potassium | 50 mg/l |
| Zinc | 4.6 mg/l |
| Chloride | 9,000 mg/l |
| Sulfate | 28,000 mg/l |
| Bromide | 20 mg/l |
| Total Suspended Solids | 7,000 mg/l |

Often, these waste streams cannot be discharged into the environment without chemical treatment. Traditionally, wastewater from a limestone scrubbing process requires at least two precipitation/flocculation stages due to the wide variation in the optimum pH values for the precipitation of the metals present. In addition, the presence of selenium, nitrates, and organics in the purge stream often require biological treatment prior to discharge. Such treatment methods may reduce the suspended solids, metals, acidity and oxygen demand, but do not reduce the chloride or total dissolved solids.

Moreover, as discharge limits become more stringent, physical, chemical and biological treatment methods may not reduce concentrations to the levels required for discharge of some chemical species. When conventional treatment methods are unable to treat scrubber waste streams to produce an effluent that meets the requirements of a discharge permit, an evaporation process may be employed. Evaporation processes evaporate substantially all the water from the waste stream and remove substantially all dissolved solids from the waste stream, resulting in a zero liquid discharge into the environment.

There are generally two approaches that have been used to achieve zero-liquid discharge of blowdown from wet scrubbers using evaporation. The first approach includes an initial clarification process to reduce suspended solids in the influent water stream. Clarified water flows to an evaporator tank where it is neutralized with acid before the water stream is preheated in plate heat exchangers. Preheated water is then deaerated using steam from the evaporator. Typically, most of the water is evaporated in a falling film evaporator at atmospheric pressure. A rotary or spray dryer is used to remove the remaining water and produce a dry solid which is sent to a landfill.

The second approach involves chemically softening the scrubber blowdown after an initial clarification process. Generally, lime and soda ash are added to the scrubber blowdown to cause substantially all of the magnesium and calcium ions to precipitate as magnesium hydroxide and calcium carbonate respectively. The precipitate is settled and removed from the scrubber blowdown. Typically, the softened scrubber blowdown is neutralized with acid before the water stream is preheated and deaerated. The scrubber blowdown is then sent to a falling film evaporator or multiple effect evaporator to vaporize the water and concentrate the scrubber blowdown. The concentrated blowdown is further evaporated in a forced circulation evaporator. A slurry of precipitated salts formed in the forced circulation evaporator is sent to a centrifuge or pressure filter to separate the solids from the water.

When evaporating solutions containing high solubility salts such as calcium, magnesium or ammonium chloride at atmospheric pressure, the temperature increases as the concentration increases. Thus, many waste stream evaporation systems operate at very high temperatures. However, many salts hydrolyze at high temperatures leading to corrosion of the evaporation system. Thus, many evaporators require the use noble alloys to withstand corrosion.

Conventional evaporation-crystallization processes for waste streams containing salts have numerous drawbacks and shortcomings. As discussed above, many processes require clarification of the feed stream prior to evaporation. In addition, conventional processes use chemicals to soften or otherwise condition the feed prior to evaporation. Clarification processes require clarifiers and the use of chemicals which increase the footprint of the treatment system as well as the capital costs and overall maintenance. Therefore, there is a need for an evaporation-crystallization process that is economical, efficient, and which is highly effective in removing contaminants from waste streams without the use of clarification or chemical conditioning.

SUMMARY OF THE INVENTION

The present invention relates to a method of removing dissolved solids from a waste stream through an evaporation-crystallization process operating at a relatively low temperature.

In one embodiment, a waste stream is directed to an evaporator. The waste stream is heated in the evaporator at a temperature less than 60° C. at a pressure less than atmospheric pressure. Water forming a part of the waste stream is evaporated which causes the waste stream to be concentrated, resulting in dissolved solids precipitating and crystallizing and which results in the formation of a slurry stream. The slurry stream is directed to a liquid-solid separator which separates the crystallized solids from the slurry.

In another embodiment, a dual stage evaporation process operated at low temperature and low pressure is utilized to remove dissolved solids from a waste stream. In this process the waste stream is directed to a first evaporator which operates at less than atmospheric pressure and which heats the waste stream to a temperature less than 60° C. At least a portion of the water in the waste stream evaporates, concentrating the waste stream, which in turn causes dissolved solids to precipitate therefrom. This results in the formation of a slurry having crystallized solids. The slurry having the crystallized solids is directed to a second evaporator that is operated at a pressure below the pressure of the first evaporator. The slurry stream is heated to a temperature of less than 60° C. causing water to evaporate therefrom which effectively further concentrates the slurry stream and results in additional dissolved solids precipitating therefrom and forming a crystallized solid in the resulting slurry stream. The resulting slurry stream is directed to a liquid-solid separator which separates the solid crystals from the slurry.

Other objects and advantages of the present invention will become apparent and obvious from a study of the following description and the accompanying drawings which are merely illustrative of such invention.

DETAILED DESCRIPTION

The present invention entails an evaporation-crystallization process for removing dissolved solids from a waste stream. This process is appropriate for removing several types of solids from a waste stream. In some embodiments, the process removes highly soluble solids such as those found in flue gas waste streams and other similar waste streams. Such highly soluble solids include calcium, magnesium, zinc and ammonium chlorides, bromides and nitrates. Often these materials cannot be removed from a waste stream using physical, chemical and biological methods. However, using the evaporation-crystallization process described herein substantially removes dissolved species from the waste stream.

The evaporation-crystallization process is operated at relatively low temperatures and low pressures. Lowering the operating pressure allows water from the waste stream to evaporate at lower temperatures. Salts often form many hydrates and double salts which precipitate at lower concentrations as the temperature of the solution is lowered. The boiling point elevation of solutions is also less at lower temperatures. Upon concentration of the waste stream at low temperature, dissolved solids will precipitate and crystallize at relatively low concentration. These solids are separated from the unevaporated water and are sent to landfill for disposal. Remaining water can be further concentrated to remove any residual dissolved solids.

In one embodiment, the present invention includes a dual stage wastewater evaporation process. In a first evaporator water from a waste stream is evaporated under pressure substantially lower than atmospheric pressure. Concentrating the waste stream promotes precipitation and crystallization of dissolved species at low temperature. The resulting slurry is further concentrated in a second evaporator under pressure substantially lower than pressure in the first evaporator. This produces a more concentrated slurry. Solids are then separated from the concentrated slurry and sent to disposal, while the separated water is recirculated to one of the evaporators for further concentration.

Figure 1:
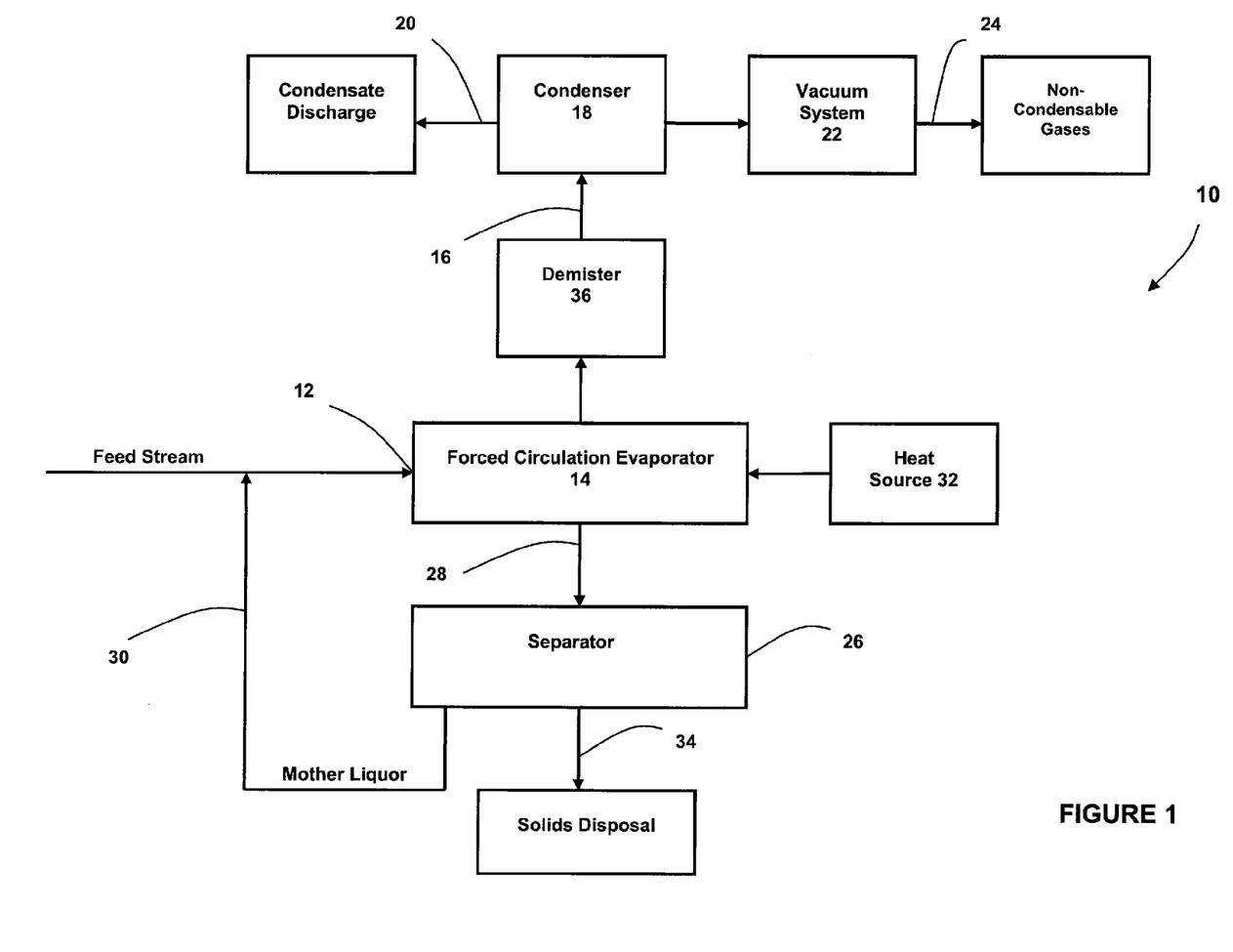
FIG. 1 is a block diagram illustrating the basic structure of a single stage low temperature crystallization system.

FIG. 1 illustrates a low temperature evaporation system 10 suitable for treating flue gas waste streams and other forms of waste streams. In this embodiment the system 10 includes a forced circulation evaporator 14 powered by a heat source 32 such as low pressure steam. Evaporator 14 includes feed stream inlet 12 to receive the flue gas waste stream or other forms of waste water. Vapor from the waste stream produced in evaporator 14 flows through vapor outlet line 16 extending between the evaporator and condenser 18. A condensate discharge line 20 extends from condenser 18. In one embodiment, vapor produced in evaporator 14 flows to demister 36, positioned upstream from condenser 18, to recover water droplets from the vapor, before the vapor flows into the condenser, which can be a mixing type using a brine below 0° C. as the condensing medium, or a surface type using chilled water above 0° C. as the condensing medium. A vacuum system 22 operatively connected to condenser 18, discharges non-condensable vapor through output line 24.

Slurry produced in evaporator 14 is directed to a liquid-solid separator 26 through a slurry outlet line 28 that extends between the evaporator and the liquid-solid separator. In one embodiment separator 26 includes a dewatering device, such as a pressure filter, centrifuge or any other type of conventional separator. A solids disposal line 34 leads from the separator 26 for discharging the separated solids. In addition, return line 30 extends between separator 26 and evaporator 14 to return mother liquor from the separator to the evaporator.

Figure 2:
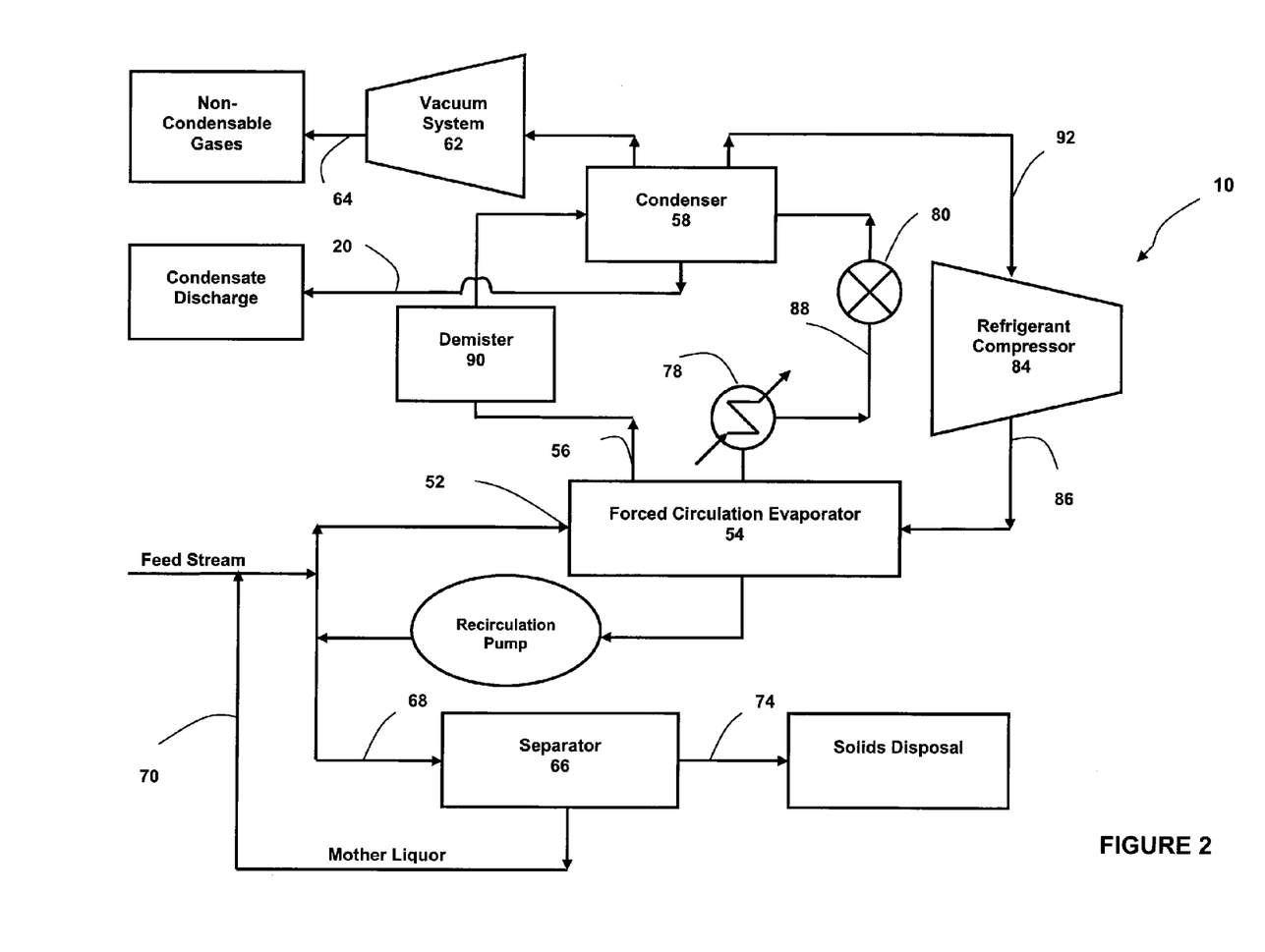
FIG. 2 is a block diagram illustrating the basic structure of a single stage low temperature crystallization system using a closed cycle heat pump.

Another embodiment of the waste stream treatment system 10 is illustrated in FIG. 2 and includes a closed cycle heat pump. In this embodiment, evaporator 54 includes feed stream inlet 52 to receive the waste stream. Vapor produced in evaporator 54 flows through vapor outlet line 56 extending between the evaporator and condenser 58. A condensate discharge line 20 extends from condenser 58. As previously described, before the vapor reaches condenser 58, the vapor may be cleaned in demister 90. A vacuum system 62 operatively connected to the condenser 58, discharges non-condensable vapor through an output line 64. In addition, vacuum system 62 is operative to lower the pressure in evaporator 54.

Slurry produced in evaporator 54 is directed to a liquid-solid separator 66 through slurry outlet line 68 extending between the evaporator and the separator. A solid disposal line 74 leads from separator 66 for discharging separated solids. Return line 70 extends between separator 66 and evaporator 54 to return the mother liquor from the separator back to the evaporator for further concentration.

A closed cycle heat pump provides the heat required to evaporate the waste stream in evaporator 54 and the cooling required to condense the vapor in condenser 58. The heat pump includes a refrigerant that is heated as it flows through compressor 84. Heated refrigerant is directed to evaporator 54 through line 86 that extends between compressor 84 and the evaporator. Heat from the refrigerant is transferred to the slurry to maintain a boiling temperature in evaporator 54. The refrigerant is then directed from evaporator 54 to heat exchanger 78 where it is cooled by cooling water or another cooling media. Cooled refrigerant is directed to condenser 58 through line 88. In one embodiment, refrigerant 82 may first be directed to expansion valve 80 before it is directed to condenser 58. When the refrigerant passes through the expansion valve 80, it expands and in the process turns cool. In condenser 58, the refrigerant causes the vapor directed from the evaporator 54 to condense, resulting in the condensate being directed from the condenser via line 20.

Figure 3:
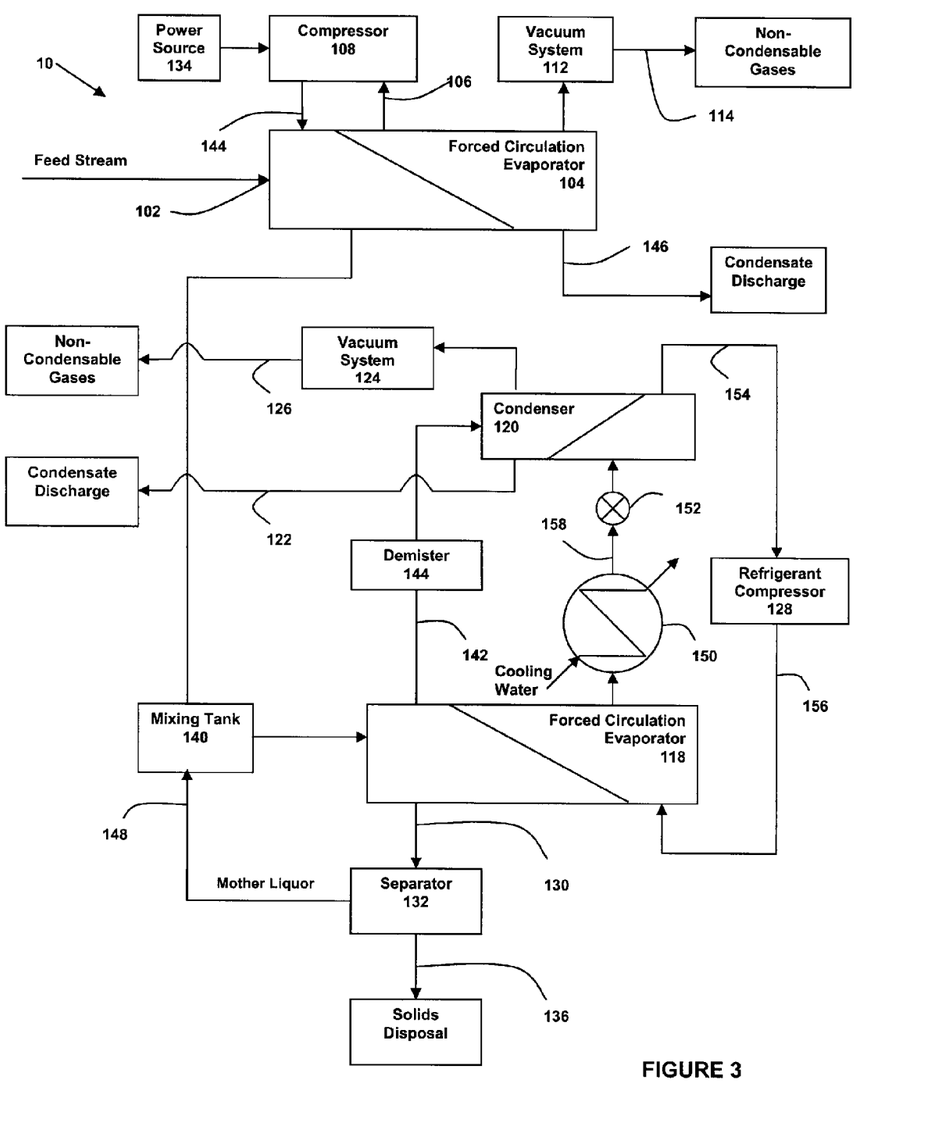
FIG. 3 is a block diagram illustrating the basic structure of a two stage low temperature crystallization system using a closed cycle heat pump in the second stage evaporator.

An example of a dual-stage evaporation waste stream treatment system 10 is shown in FIG. 3. In this embodiment system 10 includes a first evaporator 104, which may be of various types such as the preferred embodiment of a forced circulation evaporator, or a falling film evaporator.

Evaporator 104 includes a feed stream inlet 102 to receive the waste stream. Vapor produced in evaporator 104 flows to compressor 108 through vapor outlet line 106 which extends between the evaporator and the compressor. In one embodiment, compressor 108 is a mechanical vapor compressor using a low compression ratio machine such as a single stage turbofan. However, other conventional compressors may be used. Compressor 108 is powered by a power source 134, such as an electric motor. Compressed vapor returns to evaporator 104 through compressed vapor line 144 and is effective to heat slurry produced by the evaporator. Condensed vapor is discharged from evaporator 104 through outlet 146. A vacuum system 112 is operatively connected to evaporator 104 and discharges non-condensable vapor through line 114 and also functions to lower the pressure in the evaporator.

Slurry produced in evaporator 104 is directed to a second forced circulation evaporator 118, which is powered by power source, such as a closed cycle heat pump. In one embodiment, the slurry produced in evaporator 104 may be directed to mixing tank 140 before it is directed to the second evaporator 118. Vapor from the slurry produced in evaporator 118 flows through vapor outlet line 142 extending between the evaporator and condenser 120 which includes condensate discharge line 122. In one embodiment, vapor produced in evaporator 118 flows to demister 144, positioned upstream from condenser 120, to recover water droplets from the vapor, before the vapor flows into the condenser. A vacuum system 22 operatively connected to condenser 18, discharges non-condensable vapor through output line 24.

Slurry produced in evaporator 118 is directed to a liquid-solid separator 132, such as a dewatering device, through slurry outlet line 130. A solid disposal line 136 leads from separator 132 for discharging separated solids. Return line 148 extends between separator 132 and evaporator 118 to return the mother liquor from the separator back to the evaporator for further concentration. In one embodiment, the mother liquor is sent to mixing tank 140, positioned upstream from evaporator 118, where it is mixed with the slurry stream produced in the first evaporator 104, before the mother liquor is directed to the second evaporator 118 for further concentration.

A closed cycle heat pump provides the heat required to evaporate the waste stream in evaporator 118 and the cooling required to condense the vapor in condenser 120. The heat pump includes a refrigerant that is heated as it flows through compressor 128. Heated refrigerant is directed to evaporator 118 through line 156 that extends between compressor 128 and the evaporator. Heat from the refrigerant is transferred to the slurry to maintain a boiling temperature in evaporator 118. The refrigerant is then directed from evaporator 118 to heat exchanger 150 where it is cooled by cooling water. Cooled refrigerant is directed to condenser 120 through line 158. In one embodiment, refrigerant may first be directed to expansion valve 152 before it is directed to condenser 120. When the refrigerant passes through the expansion valve 152, it expands and cools. In condenser 120, the refrigerant causes the vapor directed from the evaporator 118 to condense, resulting in the condensate being directed from the condenser via line 122.

The method of the present invention may be carried out with a single evaporator or a series of evaporators. In a single evaporator embodiment, the system is preferably operated at a temperature below 60° C. Preferably, the system may operate between a range of 40° C. and 60° C. In a preferred embodiment, the system operates at 55° C. However, in some applications and usages of the invention, the system may be operated at temperatures as high as 80° C. When referring to the temperature range at which the system operates, the temperature being referred to is the boiling temperature of the waste stream or slurry in the evaporator. Further, the single evaporator operates in a pressure range of approximately 0.015 atm to approximately 0.025 atm. In a preferred embodiment, the system operates at approximately 0.017 atm. In a two evaporator embodiment, both evaporators are preferably operated at a temperature below 60° C. Preferably, both evaporators operate between a range of 40° C. and 60° C. In a preferred embodiment, both evaporators operate at approximately 55° C. However, as discussed above, in some applications and usages of the invention, both evaporators may be operated at a temperature range as high as 80° C. Further, the first evaporator in the two stage evaporation process operates in a pressure range of approximately 0.1 atm to approximately 0.2 atm. In a preferred embodiment, the first evaporator operates at approximately 0.14 atm. The second evaporator in a two stage process operates in a pressure range of approximately 0.015 atm to 0.025 atm. In a preferred embodiment, the second evaporator operates at a pressure of approximately 0.017 atm.

Since waste streams often contain a considerable concentration of dissolved and suspended solids, a forced circulation evaporator, which is tolerant to suspended solids, may be used to concentrate the waste stream. Forced circulation type evaporators can operate with up to 50% by weight suspended solids in the waste stream. In addition, a forced circulation evaporator provides an increased residency time to desaturate the slurry and minimize scaling. If a falling film evaporator is used as the first stage, an initial clarification process may be used to reduce the suspended solids in the raw feed to levels which can be accommodated by such an evaporator. However, it is noted that in a preferred embodiment, there is no requirement for clarification or for addition of chemicals required in conventional evaporation-crystallization processes.

Turning to a discussion of specific processes for treating a flue gas waste stream, reference is first made to the system and process depicted in FIG. 1. In this example, a flue gas waste stream from a limestone scrubber has contaminants described in Table 1 above. A concentrated solution with these contaminants has a boiling point elevation of approximately 40° C. Thus, to operate the system at 55° C. requires an operating pressure of 0.017 atm. Operating at such a low pressure requires using either chilled water or brine as a condensing medium to condense the vapor or a steam booster to raise the pressure of the vapor so it can be condensed with available cooling water.

The waste water stream flows into evaporator 14 through inlet 12. Water from the waste stream evaporates in evaporator 14 and forms a vapor stream. The vapor may be cleaned in demister 36 to recover any water droplets before it is condensed in condenser 18. The condensate is extracted from the condenser 18 through condensate discharge line 20 and non-condensable vapor is discharged by vacuum system 22 into output line 24. As the water evaporates, the waste stream concentrates and flue gas contaminants precipitate and crystallize, forming a slurry.

Figure 4:
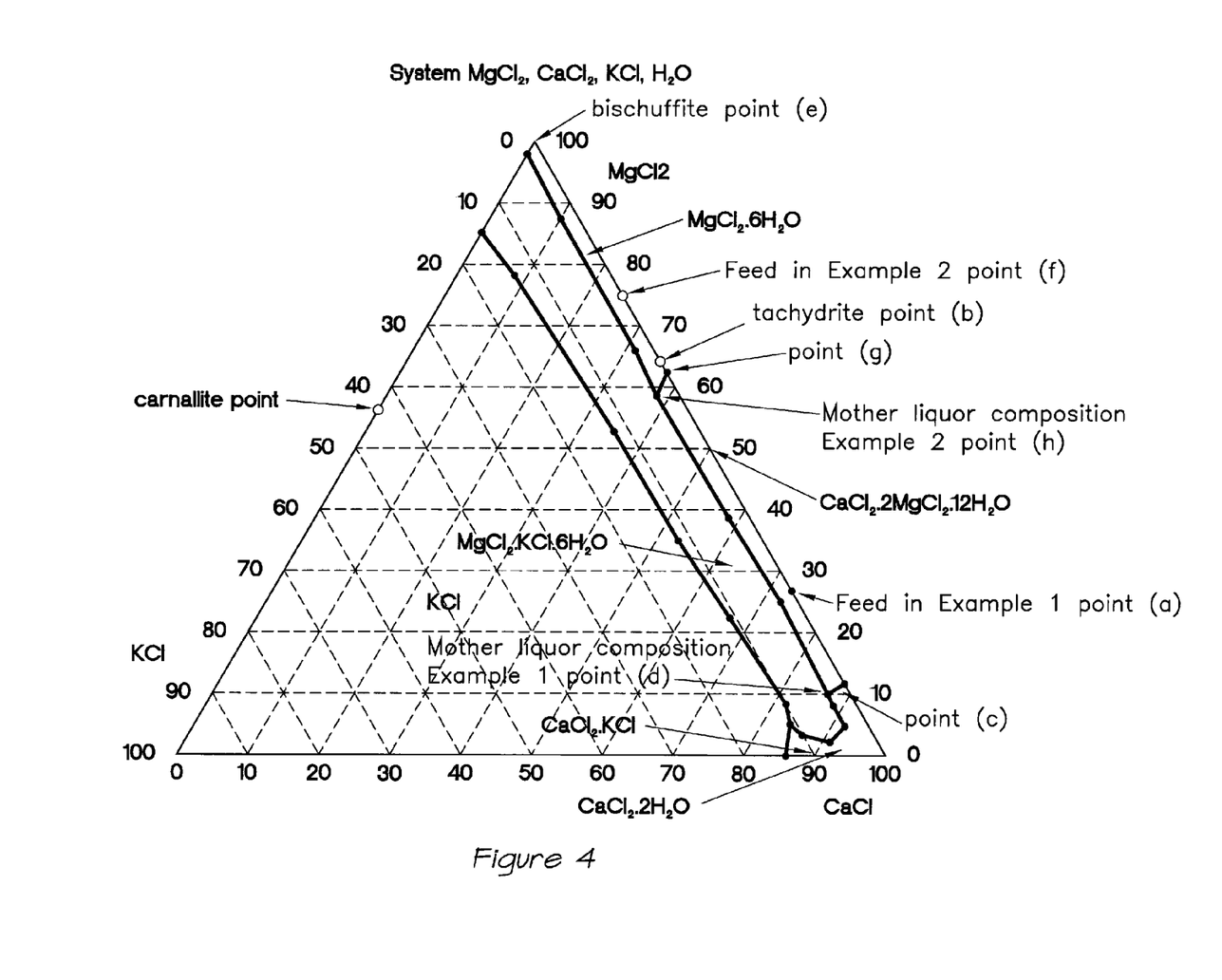
FIG. 4 is a Jänecke projection at 55° C. of the solution $MgCl_2/CaCl_2/KCl/H_2O$.

Upon concentration, solids that are supersaturated in the waste stream are the first to precipitate. In this example, the evaporator is seeded with gypsum ($CaSO_4 \cdot 2H_2O$) and thus, gypsum is the first crystal to precipitate. Most flue gas waste streams contain a high concentration of sodium and chloride and therefore, sodium chloride (NaCl) will generally co-precipitate with the gypsum when the NaCl saturation limit is reached. The solubility of NaCl in a calcium chloride solution is quite low and can be estimated from a Jänecke projection of pure $CaCl_2/NaCl/H_2O$ (about 1% NaCl in 57% $CaCl_2$ at 55° C.). As shown in FIG. 4, a Jänecke projection can be used to determine when each of the remaining dissolved species in this example will precipitate. The contaminants precipitated in the solution can be determined by the initial contaminants present in the waste water, which be determined by the fuel type and scrubbing reagent used in the flue gas scrubber.

As shown by the Jänecke projection, a waste stream having contaminants described in Table 1 above has a feed composition at point (a) (72.5 mole % $CaCl_2$, 27.0 mole % $MgCl_2$ and 0.5 mole % KCl). Since point (a) lies in the tachyhydrite ($CaCl_2 \cdot 2MgCl_2 \cdot 2H_2O$) region, upon further concentration, tachyhydrite generally begins to co-precipitate with the NaCl and gypsum. At this point, the composition of salts in solution is shown along a line joining the tachyhydrite point (b) to the feed point (a) away from the tachyhydrite point (b). The line intersects the solubility curve which divides tachyhydrite from calcium chloride dihydrate ($CaCl_2 \cdot 2H_2O$). When this point (c) is reached, calcium chloride dihydrate will begin to co-precipitate. The waste stream will further concentrate and the solution composition will move to the left along the solubility curve until it reaches point (d) where the solid phases of tachyhydrite ($CaCl_2 \cdot 2MgCl_2 \cdot 2H_2O$), calcium chloride dihydrate ($CaCl_2 \cdot 2H_2O$) and carnallite ($KMgCl_3 \cdot 6H_2O$) all co-exist. On the Jänecke projection, this point is known as the invariant point. At steady state and constant temperature of 55° C., the composition of the mother liquor is fixed. At a temperature of 55° C. and pressure of 0.017 atm, a solution in equilibrium with tachyhydrite, calcium chloride dihydrate, and carnallite has a boiling point elevation around 40° C. compared to about 75° C. at atmospheric pressure.

The remaining water and crystallized solids form a slurry that is directed to a separator 26, such a centrifuge, through slurry outlet line 28. These crystallized solids grow relatively large allowing the solids to be separated with very low residual moisture. The crystallized solids form a wet cake that can be directed through solid disposal line 34 without further drying. Upon cooling calcium chloride dihyrdrate converts to calcium chloride tetrahydrate ($CaCl_2 \cdot 4H_2O$) and absorbs residual free water. The separated water is recirculated from separator 26 to evaporator 14 through return line 30 for further concentration and crystallization. Return line 30 leads into feed inlet 12 so that the raw waste stream mixes with the recirculating slurry in evaporator 14.

As shown in FIG. 2, one embodiment uses a closed cycle heat pump with an appropriate refrigerant as the working fluid to supply the energy required for evaporating the water, heating the slurry and condensing the water vapor. Several different refrigerants can be used as the working fluid, including ammonia or hydrofluorocarbons. A refrigerant compressor 84 compresses and heats the refrigerant fluid. The heated refrigerant fluid then flows through the heated refrigerant line 86 to evaporator 54 where, through partial condensation, the refrigerant transfers a portion of its heat to the slurry. Water from the slurry evaporates in evaporator 54 and forms a vapor stream that flows to condenser 58.

After leaving evaporator 54, the refrigerant flows to heat exchanger 78 where it is further cooled and condensed by cooling water. The heat removed from the refrigerant is released into the environment. The cooled refrigerant then flows through a cooled refrigerant line 88 to expansion valve 80 before it is directed into condenser 58 where it vaporizes by heat transferred from condensing vapor. The refrigerant fluid then flows through refrigerant recirculation line 92 to compressor 84 where it is reheated. The condensate is extracted from the condenser 58 and non-condensable vapor is discharged by vacuum system 62.

Slurry produced in evaporator 54 is directed to separator 66 where the crystallized solids form a wet cake that can be directed through solid disposal line 74. The separated water, or mother liquor, is returned from separator 66 to evaporator 54 through return line 70 for further concentration and crystallization. The mother liquor may be directed directly to evaporator 54 or may be mixed with the raw waste stream before it is directed to the evaporator. In either case, the slurry produced by the evaporator 54 is continuously recirculated to and from the evaporator. By utilizing a flow divider or other type of flow control device, the recirculating slurry is divided where a portion of the slurry returns to the evaporator 54 and another portion is directed to the separator 66.

Using a closed cycle heat pump reduces the size of the compressor otherwise required for an open cycle mechanical vapor recompression (MVR) heat pump that uses water vapor as the working fluid. Separating the process fluid from the working fluid into two separate circuits protects the compressor if foaming occurs in the evaporator.

As noted above, this process is effective without the addition of chemicals. In addition, this example shows that all heat required to drive the process may be derived from the mechanical energy supplied by the compressor. Since the evaporation is done at close to ambient temperature, there is no need for preheaters which tend to foul in the wastewater service.

To lower the power requirement of the invention, the system can be split into two stages of evaporation, as shown in FIG. 3. In this example, a waste stream from a dolomitic limestone scrubber has contaminants as described in Table 2 above. Since the raw waste stream is often dilute, the boiling point elevation is generally between 2° C.-3° C. Thus, to operate the system at 55° C. an operating pressure in the first evaporator of about 0.14 atm is used.

In the process shown in FIG. 3, a waste stream is fed into a first evaporator 104. Vapor produced in evaporator 104 is directed to compressor 108 where it is compressed and heated. In one embodiment, compressor 108 is a mechanical vapor compressor using a low compression ratio machine such as a single stage turbofan. The heated vapor flows back to evaporator 104 to heat the slurry formed in the evaporator. As the vapor transfers its heat to the slurry, the vapor condenses and the condensate is discharged through outlet 146. A vacuum system 112 discharges non-condensable vapor through outlet line 114 and maintains a predetermined low pressure in evaporator 104. Typically, the first evaporation stage can remove approximately 60% to 80% of the water from the raw waste stream.

As discussed above, first evaporator 104 is driven by a conventional MVR cycle, such as a single stage turbofan. An increased slurry concentration could be achieved in first evaporator 104 but would require the use of a two-stage fan to overcome the higher boiling point elevation of the increased slurry concentration.

Upon concentration of a waste stream in evaporator 104 having the contaminants listed in Table 2 above, solids that are supersaturated in the waste stream are the first to precipitate. As discussed above, often the first evaporator 104 is seeded with gypsum ($CaSO_4.2H_2O$) and thus, gypsum is the first crystal to precipitate. Upon further concentration sodium chloride will generally co-precipitate with the gypsum. As shown by the Jänecke projection in FIG. 4, point (e) is representative of the feed composition. Since point (e) lies in the bischofite ($MgCl_2.6H_2O$) region, upon further concentration, bischofite will begin to co-precipitate with the sodium chloride and gypsum.

To remove additional water from the slurry formed by first evaporator 104, the slurry can be directed to a second evaporation stage. In this example, slurry from evaporator 104 is directed to a mixing tank 140 before it is directed to second evaporator 118. The slurry entering evaporator 118 is more concentrated than the waste stream entering first evaporator 104 and thus has a higher boiling point elevation. To operate the system at 55° C. requires an operating pressure lower than the first evaporation. In this example, the in the second evaporator operates at a pressure of 0.017 atm.

Second evaporator 118 evaporates water from the slurry forming a more concentrated slurry stream. Tachyhydrite begins to co-precipitate with bischofite, sodium chloride and gypsum, as shown at point (g) on the Jänecke projection. Upon further concentration, the solid phases of bischofite, tachyhydrite and carnallite all co-exist at point (h).

The vapor stream produced in evaporator 118 flows through vapor outlet line 142 into condenser 108 where it is condensed and discharged through condensate discharge line 122. The vapor may be cleaned in demister 144 to recover any water droplets before it is condensed in condenser 120. Non-condensable vapor is discharged by vacuum system 124 through outlet line 126. In one embodiment, the vapor is condensed by vaporizing a refrigerant fluid such as ammonia, in a closed cycle heat pump. In the alternative, the vapor may be condensed in a mixing condenser with a brine at a temperature below 0° C., or the vapor may be condensed on a surface condenser with a condensing medium of chilled water above 0° C. to prevent ice formation.

In a closed cycle heat pump, a refrigerant compressor 128 compresses and heats the refrigerant fluid. The heated refrigerant fluid then flows through the heated refrigerant line 156 to evaporator 118 where, through partial condensation, the refrigerant transfers a portion of its heat to the slurry. Water from the slurry evaporates in evaporator 118 and forms a vapor stream that flows to condenser 120.

After leaving evaporator 118, the refrigerant flows to heat exchanger 150 where it is further cooled and condensed by cooling water. The heat removed from the refrigerant is released into the environment. The cooled refrigerant then flows through a cooled refrigerant line 158 to expansion valve 152 before it is directed into condenser 120 where it vaporizes by heat transferred from condensing vapor. The refrigerant fluid then flows through refrigerant recirculation line 154 to compressor 128 where it is reheated. The condensate is extracted from the condenser 120 and non-condensable vapor is discharged by vacuum system 124.

Slurry produced in evaporator 118 flows through slurry outlet line 130 into a liquid-solid separator 132, such as a centrifuge. Generally, 20-30% by weight slurry is sent to the separator. The crystallized solids form a wet cake that can be disposed of through solid disposal line 136. The separated water, or mother liquor, is returned from separator 132 to evaporator 118 through return line 148 for further concentration and crystallization. The mother liquor may be directed directly to evaporator 118 or may be mixed with the raw waste stream before it is directed to the evaporator. In either case, the slurry produced by the evaporator 118 is continuously recirculated to and from the evaporator. By utilizing a flow divider or other type of flow control device, the recirculating slurry is divided where a portion of the slurry returns to the evaporator 118 and another portion is directed to the separator 132.

The same principle of concentration at low temperatures and pressures applies to any weak solution which contains materials such as calcium, magnesium, ammonium or zinc chlorides, or bromides or nitrates. Thus, this low temperature evaporation process can be applied to wastewaters derived from FGD scrubbers, syngas scrubbers in gasification plants, and landfill leachates.

Corrosivity is greatly reduced from that which would be experienced at temperatures found when operating at atmospheric pressure. In addition, the lower operating temperatures results in a much lower hydrolysis rate for magnesium chloride ($MgCl_2$) and calcium chloride ($CaCl_2$) and produces a less aggressive solution with reduced risk of corrosion. This allows use of a wider variety of materials in the construction of the system.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:
1. A method for removing dissolved solids from waste streams comprising:

evaporating water from the waste stream in a first evaporator under pressure substantially lower than atmospheric pressure and forming a first slurry stream having crystallized solids;

removing dissolved solids in the first slurry stream by evaporating water from the first slurry stream in a second evaporator under pressure substantially lower than the pressure in the first evaporator and forming a second slurry stream having crystallized solids; and separating at least a portion of the crystallized solids from the second slurry stream and forming a mother liquor and solid cake.

2. The method of claim 1 including evaporating water from the waste stream in the first evaporator at a temperature of less than 60° C. and at a pressure in the range of approximately 0.1 atm to approximately 0.2 atm; and evaporating water from the first slurry stream in the second evaporator at a temperature less than 60° C. and at a pressure of approximately 0.015 atm to approximately 0.025 atm.

3. The method of claim 2 further comprising evaporating water from the waste stream in the first evaporator at a temperature of approximately 55° C. and at a pressure of approximately 0.14 atm; and evaporating water from the first slurry stream in the second evaporator at a temperature of approximately 55° C. and at a pressure of approximately 0.017 atm.

4. The method of claim 1 further comprising mixing at least a portion of the first slurry stream with at least a portion of the mother liquor in a mixing tank prior to evaporating water from the first slurry stream in a second evaporator.

5. The method of claim 1 further comprising separating at least a portion the crystallized solids from the second slurry stream in a centrifuge.

6. The method of claim 1 further comprising:
forming a first vapor stream in the first evaporator and condensing at least a portion of the first vapor stream;
heating at least a portion of the first slurry stream with the first vapor stream;
forming a second vapor stream in the second evaporator and condensing at least a portion of the second vapor stream; and
heating at least a portion of the second slurry stream with a heated refrigerant.

7. The method of claim 1 including heating the waste stream to a temperature of approximately 55° C. in the first evaporator and heating the first slurry stream to a temperature of approximately 55° C. in the second evaporator.

8. The method of claim 1 further comprising evaporating water from the waste stream in the first evaporator at a pressure of approximately 0.14 atm and evaporating water from the first slurry stream in the second evaporator at a pressure of approximately 0.017 atm.

9. The method of claim 1 including:
evaporating water from the waste stream at a temperature less than 60° C. and at a pressure in the range of approximately 0.1 atm to approximately 0.2 atm;
evaporating water from the first slurry stream in a second evaporator at a temperature less than 60° C. and at a pressure of approximately 0.015 atm to approximately 0.025 atm;
forming a first vapor stream in the first evaporator and condensing at least a portion of the first vapor stream;
heating at least a portion of the first slurry stream with at least a portion of the first vapor stream;
forming a second vapor stream in the second evaporator and condensing at least a portion of the second vapor stream;

heating at least a portion of the second slurry stream in the heat exchanger with a heated refrigerant.

10. The method of claim 1 including evaporating water from the waste stream in the first evaporator at a temperature of less than 80° C. and evaporating water from the first slurry stream in the second evaporator at a temperature of less than 80° C.

11. The method of claim 10 further comprising separating crystallized solids from the second slurry stream to form a solid cake and mother liquor, and directing the first slurry stream to a mixing tank and mixing the mother liquor with the first slurry stream in the mixing tank.

12. The method of claim 10 further comprising separating at least a portion of the crystallized solids from the second slurry stream in a centrifuge.

13. The method of claim 12 further comprising evaporating water from the waste stream in the first evaporator at a temperature of approximately 55° C. and at a pressure of approximately 0.14 atm and evaporating water from the first slurry stream in the second evaporator at a temperature of approximately 55° C. and at a pressure of approximately 0.017 atm.

14. The method of claim 10 including evaporating water from the waste stream in a first evaporator at a temperature of less than 60° C. and at a pressure in the range of approximately 0.1 atm to approximately 0.2 atm; and evaporating water from the first slurry stream in the second evaporator at a temperature less than 60° C. and at a pressure of approximately 0.015 atm to approximately 0.025 atm.

15. The method of claim 10 further comprising heating the waste stream in the first evaporator to a temperature of approximately 55° C. and heating the first slurry stream in the second evaporator to a temperature of approximately 55° C.

16. The method of claim 10 further comprising evaporating water from the waste stream in the first evaporator at a pressure of approximately 0.014 atm and evaporating water from the first slurry stream in the second evaporator at a pressure of approximately 0.017 atm.

17. A method for removing dissolved solids from a waste stream comprising:
evaporating water from the waste stream in a first evaporator under pressure substantially lower than atmospheric pressure to form a first vapor stream and concentrating the waste stream causing dissolved solids to precipitate therefrom to form a first slurry stream having crystallized solids;
mechanically compressing at least a portion the first vapor stream;
condensing at least a portion of the mechanically compressed first vapor stream;
heating at least a portion of the first slurry stream with at least a portion of the mechanically compressed first vapor stream;
removing at least a portion of remaining dissolved solids in the first slurry stream by evaporating water from the first slurry stream in a second evaporator under pressure substantially lower than the pressure in the first evaporator to form a second vapor stream and concentrating the first slurry stream causing dissolved solids to precipitate therefrom to form a second slurry stream having crystallized solids;
condensing at least a portion of the second vapor stream;
heating at least a portion of the second slurry stream with a refrigerant; and
separating at least a portion of the crystallized solids from the second slurry stream.

18. A method for removing dissolved solids from a waste stream, comprising:

directing the waste stream to an evaporator;
removing dissolved solids from the waste stream by heating the waste stream in the evaporator to a temperature below 60° C. and at a pressure substantially below atmospheric pressure causing water to be evaporated from the waste stream and concentrating the waste stream causing dissolved solids therein to precipitate therefrom which results in the formation of a slurry stream;
directing the slurry stream to a solids separator; and
separating the solids from the slurry stream.

19. The method of claim 18 further including heating the waste stream and condensing the vapor with a closed cycle heat pump.

20. The method of claim 18 further comprising condensing the vapor with a closed cycle heat pump.

21. The method of claim 18 further comprising raising the pressure of the vapor with a steam booster and then condensing the vapor with cooling water.

22. The method of claim 18 further comprising circulating a working fluid through a closed cycle heat pump, wherein circulating the working fluid through the heat pump includes:
compressing and heating the working fluid in a compressor;
heating the waste stream in the evaporator with the heated working fluid;
cooling the working fluid with cooling water in a heat exchanger; and
condensing at least a portion of the vapor with the cooled working fluid.

23. The method of claim 22 further comprising evaporating water from the waste stream in the first evaporator at a pressure in the range of approximately 0.1 atm to approximately 0.2 atm; and evaporating water from in the first slurry stream in the second evaporator at a pressure in the range of approximately 0.015 atm to approximately 0.025 atm.

24. The method of claim 23 further comprising:
directing the first slurry stream to a mixing tank;
separating the second slurry stream into a mother liquor and solids;
mixing the mother liquor with the first slurry stream in the mixing tank; and
directing the mixture of mother liquor and the first slurry steam to the second evaporator.

25. The method of claim 22 further comprising:
heating the second slurry in the second evaporator with a working fluid;
cooling the working fluid in a heat exchanger;
condensing the second vapor stream with the cooled working fluid; and
after condensing the second vapor stream, heating the working fluid by compressing the working fluid in a compressor.

26. A method for removing dissolved solids from a waste stream, comprising:
evaporating water from the waste stream in a first evaporator at a temperature of less than 60° C. and under pressure substantially lower than atmospheric pressure to form a first vapor stream and a first slurry stream;
compressing at least a portion of the first vapor stream;
heating at least a portion of the first slurry stream with at least a portion of the compressed first vapor stream;
evaporating water in the first slurry stream in a second evaporator at a temperature of less than 60° C. and under pressure substantially lower than the pressure in the first evaporator to form a second vapor stream and a second slurry stream; and
heating the second slurry in the second evaporator and condensing the second vapor stream with a closed cycle heat pump.

27. A method for removing dissolved solids from a waste stream comprising:
directing the waste stream to a crystallizer operated below atmospheric pressure;
evaporating water from the waste stream in the crystallizer and forming a slurry stream having crystallized solids;
directing the slurry stream to a separator; and
separating at least a portion of the crystallized solids from the slurry stream and forming a mother liquor and a solid cake.

28. The method of claim 27 including evaporating water from the waste stream in the crystallizer at a temperature less than 80° C.

29. The method of claim 27 including evaporating water from the waste stream in the crystallizer at a temperature of less than 60° C. and at a pressure of less than 0.2 atm.

* * * * *